*Joseph A. Andrews.*
INVENTOR
BY
ATTORNEY

Aug. 17, 1954

J. A. ANDREWS 2,686,601

DRAFT GEAR

Filed Aug. 27, 1952

INVENTOR
Joseph A. Andrews.
BY
ATTORNEY

Patented Aug. 17, 1954

2,686,601

UNITED STATES PATENT OFFICE 2,686,601

DRAFT GEAR

Joseph A. Andrews, Park Forest, Ill., assignor to Poor & Company, Chicago, Ill., a corporation of Delaware Application August 27, 1952, Serial No. 306,537

2 Claims. (Cl. 213—34)

This invention relates to an improvement in draft gears of the type shown in Patent No. 2,417,410, issued March 18, 1947.

One of the objects of the invention is to provide a so-called "differential action" between the friction shoes and the housing whereby the shock of buffing and draft forces are automatically compensated for according to the intensity of the blows. For example, upon light impact imposed on the wedge, the contact between the shoes and the housing results in a relatively soft resistance to closure by the draft gear. As the intensity of the impact on the wedge increases and the housing is drawn inwardly on its minor axis, additional contact between the friction shoes and the housing progressively takes place to provide greater resistance to closure by the gear with resultant increase in capacity.

Another object of the invention is to provide an improved equalizer means between the shoes and the wedge to insure quick release after the load is removed. That is to say, it is proposed to provide the equalizer surfaces which bear against the wedge with means which acts as a mild lubricant and serves to maintain a constant coefficient of friction between the equalizer and the wedge, while at the same time preventing sticking.

With the above and other objects in view, the invention consists in the combination, and arrangement of parts hereinafter more fully described and claimed.

A preferred and practical embodiment of the invention is shown in the accompanying drawings in which.

Similar reference characters designate corresponding parts throughout the several figures of the drawings.

Figure 1:
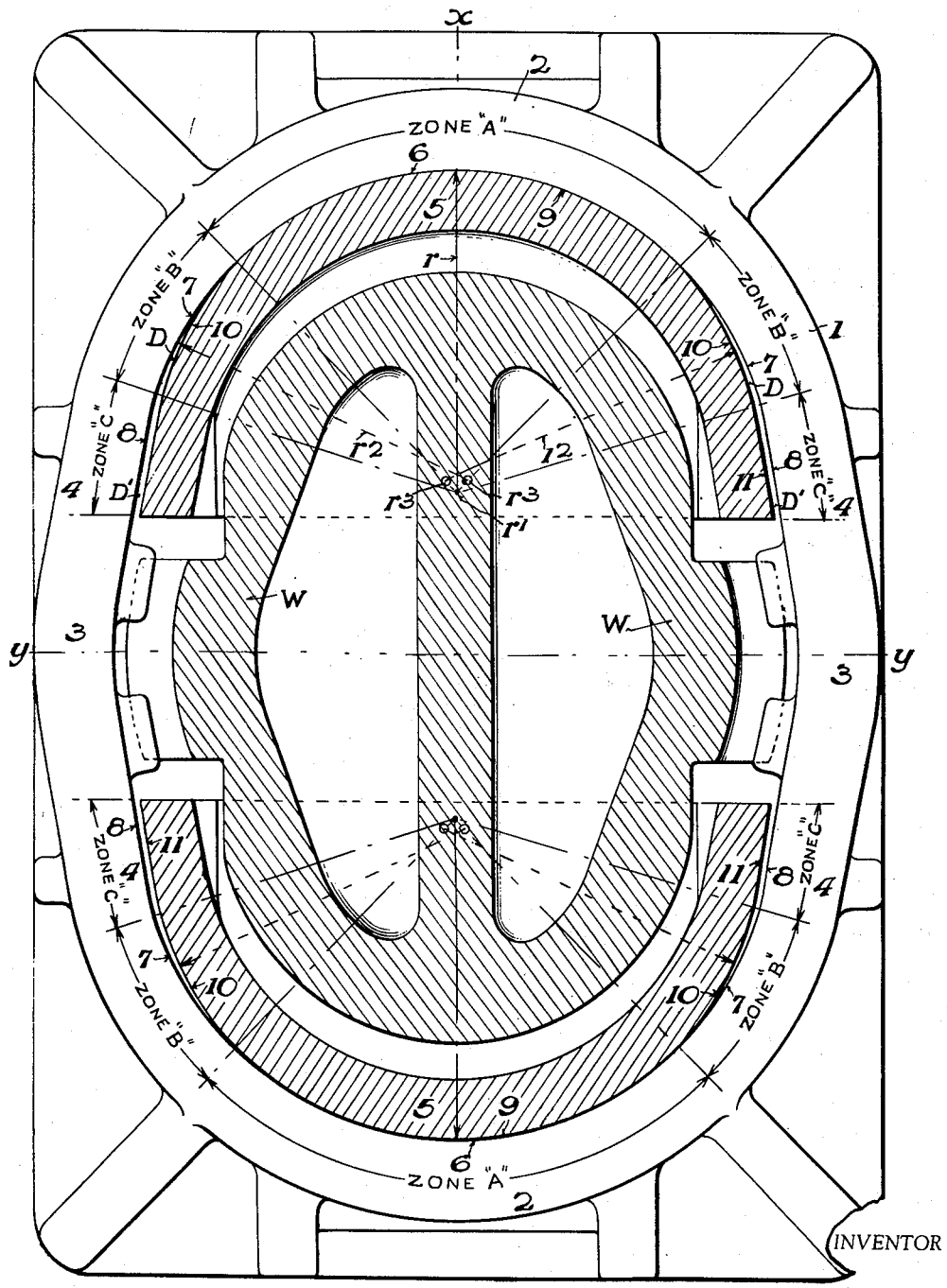
Figure 1 is a cross-sectional view taken on line 1—1 of Figure 2.

Referring first to Figure 1, the housing 1 is of oval formation as described in the patent aforesaid and is rounded at the ends 2—2 of its major axis $x$—$x$ and also rounded at the sides 3—3 in the direction of its minor axis $y$—$y$. The rounded portions 2 and 3 of the housing are joined by connecting portions 4, which cross-sectionally of the housing 1 are flared from the rounded portions 2 toward the rounded portions 3 and which connecting portions are shown in the drawings as substantially straight or flat.

The housing 2 at the ends of its major axis is provided with primary internal cylindrical surfaces 6 and the secondary internal friction surfaces 7 and 8, the first of said surfaces 7 being described by an arc joining the flat secondary surface 8 on the inner face of the relatively flat connecting surface 4.

The shoes 5 are each provided with primary cylindrical friction surfaces 9 which are formed by the radius $r$ having axis $r'$ and extending through an angle of 90° defined by "Zone A" on Figure 1.

With a radii $r^2$ of the same length as the radius $r$ but having their axes $r^3$ eccentric to the axis $r'$ of the radius $r$, the shoes are formed with secondary friction surfaces 10 which within the "Zone B" move away from the cylindrical surface 9 thus providing easements or clearances D which progress in width from the beginning of "Zone B" toward "Zone C" to provide a progressive easement which terminates substantially at the junction of the flat connecting portions 4 with the rounded portions 2 of the housing. The angular length of the secondary surfaces 10 lying in "Zone B" is approximately 29°, and, of course, as just explained, are of a different curvature from the cylindrical surface 9 which engages the primary cylindrical surface 6 of the housing.

The shoes 5 are provided at their end portions with the substantially flat tangent secondary friction surfaces 11 which lie opposite the secondary surfaces 8 of the housing, and maintain the uniform easement D' under light draft or buffing loads. The length of the surface 11 is approximately 16°. Thus, the outer friction surfaces of the shoes comprise a cylindrical portion 9 of approximately 90° and two secondary surfaces 10 of approximately 29° and the two substantially flat secondary surfaces 11 of approximately 16° or a total of 180° in all. Eventually all of said surfaces may engage the housing as wear occurs but the softness and capacity of the gear will be maintained.

When impact on the wedge W causes the shoes 5 to move relatively to the housing, the cylindrical surfaces 9 of each shoe will engage surfaces 6 of the housing to provide a relatively soft resistance to closure by the draft gear, and, as the intensity of the impact on the wedge W increases, the resulting pressure on the major axis $x$—$x$ causes the housing to be drawn inwardly on the minor axis $y$—$y$. This action results in the housing deflecting inwardly so that the surfaces 7 of the housing and secondary surfaces 10 of the shoes in "Zone B" come in contact, to produce in effect, a clamping or pinching action in this zone, thus, providing greater resistance to closure by the draft gear and, therefore, the capacity of the gear is greatly increased.

As wear occurs in "Zone A" between the primary surfaces 6 and 9, and surfaces 7 and 10 of "Zone B," more and more of "Zone C" comes into action to effect further pinching action so that eventually the surfaces 8 of the housing and surfaces 11 of the shoes will come into engagement. The initial soft resistance to closure by the gear in "Zone A" and the secondary clamping or pinching action in "Zone B" will also be maintained to give the desired softness and yet proper and adequate capacity over a long period of time.

Figure 2:
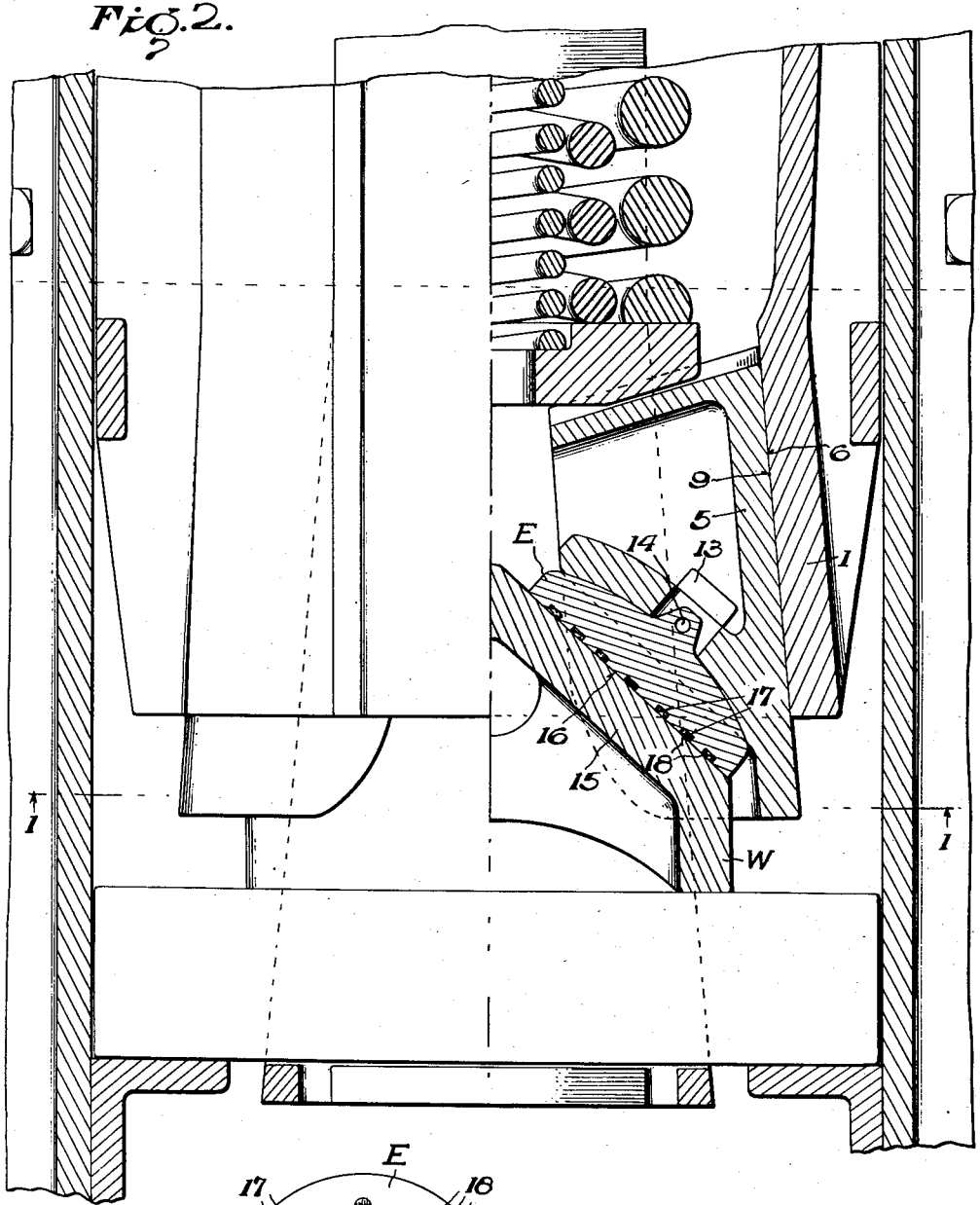
Figure 2 is a longitudinal sectional view of the wedge and shoe portion of the draft gear illustrating the present embodiment of the shoe and the improved equalizer unit.
Figure 3:
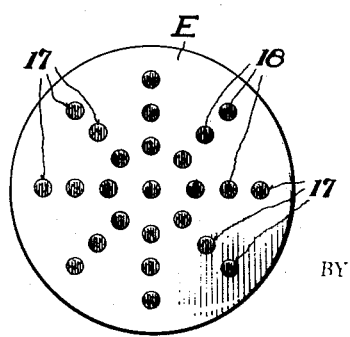
Figure 3 is a bottom plan view of the equalizer.

Referring to Figure 2 which shows one of the equalizers E carried by its related shoe 1, it will be observed that said equalizer is held to the transverse web of the shoe by the shank portion 13 thereof fitting in a corresponding opening in said web and held thereto by an appropriate key 14. This key is used primarily in assembling the equalizer to the shoe during the setting up of the gear because after the equalizer is once assembled in the gear, the flat surface of the inclined wall 15 of the wedge W will hold the equalizer in place. The surface 16 of the equalizer which engages the related face of the web 15 and the wedge is provided with a plurality of recesses or pockets 17 which are filled with lead 18.

It will be seen that the recesses 17 are arranged in a concentric circular pattern and the axes of the recesses lie in radii spaced 45° apart so that more lead is present at the center of the equalizer than toward its peripheral edges, thus providing lubrication where it is needed most and preventing an excess working out at the edges.

The lead acts as a mild lubricant which serves to maintain a constant coefficient of friction between the abutting faces of the equalizer and the inclined wall of the wedge. It has been found in practice that this expedient prevents galling and avoids sticking of the wedge and shoes to permit ready release of the wedge from the shoes when buffing or draft forces are released. Thus, this feature contributes materially to the smooth and efficient operation of the gear.

I claim:

1. A draft gear housing having open end portions of generally oval form in cross-section, rounded at the ends of its major and minor axis and including connecting portions between said rounded portions flared cross-sectionally of the housing with respect to the rounded portions at the ends of the major axis of said open end portion, the rounded portions at the ends of the major axis of said open end portions having primary internal friction surfaces of cylindrical form extending longitudinally of the housing and converging inwardly relative thereto, said connecting portions having a secondary internal friction surface constituting a continuation of said primary friction surfaces and flared cross-sectionally of the housing with respect thereto, and a pair of friction shoes each having a plurality of outer friction surfaces, one of said surfaces of each shoe being of cylindrical form complementing and constantly engaged with said primary internal friction surfaces of the major axis of the housing, and the other of said surfaces comprising arcuate portions of the same radius as said cylindrical portion but having their axes eccentric to the axis of the radius of the cylindrical portion, and a further secondary friction surface of substantially flat form lying opposite the said connecting portion of the housing, both of said secondary surfaces of the shoes adapted for progressive engagement with the normally spaced related surfaces of the housing as the latter flexes inwardly along its minor axis under increased pressure of the cylindrical surfaces of the shoes engaging the primary cylindrical friction surfaces of the housing.

2. In a draft gear, the combination including, an oval housing rounded at the ends of its major and minor axes and including connecting portions between said rounded portions, the rounded portions at the ends of the major axis having primary internal friction surfaces of cylindrical form extending longitudinally of the housing and converging inwardly relative thereto, said connecting portions including arcuate secondary internal friction surfaces adjacent to and constituting a continuation of said primary internal friction surfaces, and a pair of friction shoes each including a plurality of arcuate outer friction surfaces, one of said surfaces of each shoe being of cylindrical form complementing and constantly engaged with a related primary internal friction surface of the major axis of the housing, and the other of said surfaces comprising arcuate portions of the same radius as said cylindrical portion of the housing but having their axes eccentric to the axis of the radius of the said cylindrical portion.

References Cited in the file of this patent

UNITED STATES PATENTS

| Number | Name | Date |
|---|---|---|
| 840,027 | Stucki | Jan. 1, 1907 |
| 1,914,479 | Brooks | June 20, 1933 |
| 1,955,393 | Spence | Apr. 17, 1934 |
| 2,417,410 | Gray | Mar. 18, 1947 |

FOREIGN PATENTS

| Number | Country | Date |
|---|---|---|
| 303,100 | Great Britain | Sept. 4, 1928 |
| 303,101 | Great Britain | Sept. 4, 1928 |